(12) United States Patent
Huang

(10) Patent No.: US 6,406,288 B2
(45) Date of Patent: *Jun. 18, 2002

(54) APPARATUS FOR EXTRUSION MOLDING UTILIZING CLAMPING DEVICES AND MEANS FOR RELEASING COMPRESSED AIR

(76) Inventor: Ing Chung Huang, No. 218 Cheng Kung Three Road, Naniou city (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,853

(22) Filed: Jul. 27, 1999

Related U.S. Application Data

(62) Division of application No. 08/876,495, filed on Jun. 16, 1997, now Pat. No. 6,027,683.

(30) Foreign Application Priority Data

Jun. 17, 1996 (TW) ........................................ 85107312 A

(51) Int. Cl.[7] ........................... B29C 47/20; B29C 49/62
(52) U.S. Cl. .................... 425/532; 264/526; 425/451.9; 425/541
(58) Field of Search ............................. 425/451.9, 532, 425/541, 522, 812; 264/529, 524, 526, 532, 534, 540, 541

(56) References Cited

U.S. PATENT DOCUMENTS

| 4,882,978 A | * 11/1989 | Bruggeman et al. ........... 92/34 |
| 4,966,543 A | * 10/1990 | Krishnakumar et al. ..... 425/522 |
| 5,700,498 A | * 12/1997 | Renzo et al. ................ 425/532 |
| 5,989,482 A | * 11/1999 | Sagawa ....................... 264/515 |
| 6,106,762 A | * 4/2000 | Agur et al. .................. 264/512 |

FOREIGN PATENT DOCUMENTS

| DE | 4230375 A1 | * 3/1994 |
| FR | 1338443 | * 7/1962 |
| JP | 36469326 A | * 3/1989 |
| JP | 406039908 A | * 2/1994 |

* cited by examiner

*Primary Examiner*—Tim Heitbrink
*Assistant Examiner*—Emmanuel Luk
(74) *Attorney, Agent, or Firm*—Bacon & Thomas, PLLC

(57) ABSTRACT

An apparatus for extrusion molding that includes an extruding die that permits extrusion of a material into a hollow tubular molding, a molding die, first and second clamping devices and a device for releasing compressed air. The first and second clamping devices are positioned along opposite end portions of the molding die and configured to clamp the molding independently from one another to form an air-tight space therebetween. The molding die includes two die cavity halves and is arranged to close around the air-tight space and compress the molding to conform the same to a final product configuration. The device for releasing compressed air is arranged to release compressed air before the die cavity halves are separated.

13 Claims, 10 Drawing Sheets

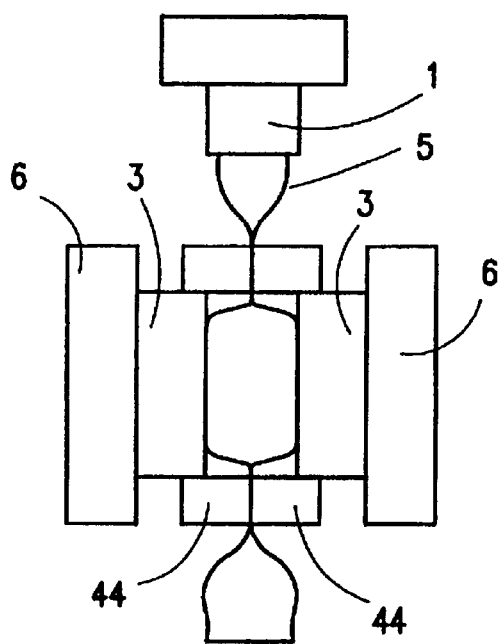
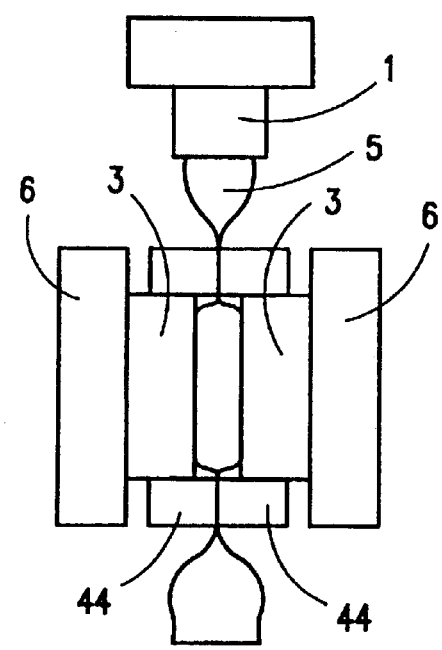
FIG. 16     FIG. 17
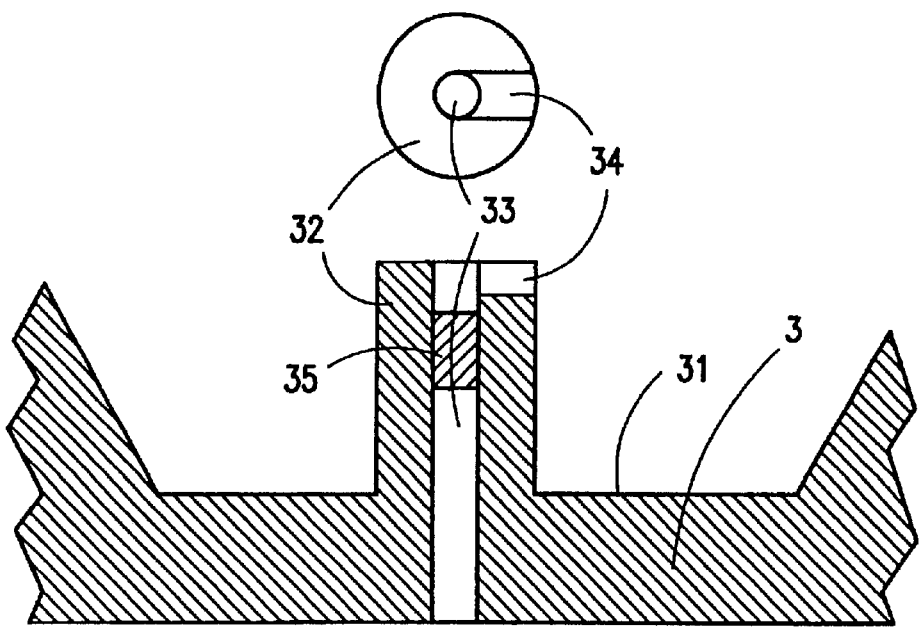
FIG. 18

APPARATUS FOR EXTRUSION MOLDING UTILIZING CLAMPING DEVICES AND MEANS FOR RELEASING COMPRESSED AIR

This application is a Division of nonprovisional application Ser. No. 08/876,495 now U.S. Pat. No. 6,027,683 filed Jun. 16, 1997.

BACKGROUND OF THE INVENTION

The present invention relates to an extrusion molding process, and more particularly to such an extrusion molding process in which the extruded tubular molding from an extruding die is clamped by two clamping devices at different elevations and downwardly stretched, and two symmetrical halves of a molding die are closed on the clamped molding between the clamping devices, causing the clamped molding to be compressed and molded into a finished product.

According to a conventional method of fabricating hollow plastic products through an extrusion molding process, plastic material is extruded into a molding through an extending die and then seized by clamping means and retained in a die cavity of a molding die, and then a cutting tool is moved to cut off the molding from the extruding die, and then a nozzle is inserted into the molding and air is blown into the molding in the die cavity of the molding die, causing the molding to be expanded and molded into a finished product. After molding, the molding die is lowered and then opened. After the finished product is removed from the molding die, the molding die is returned to its former position for a next molding cycle. This extrusion molding method has numerous drawbacks outlined hereinafter:

1. Nozzle and blower means must be provided so that air can be blown into the extruded molding, causing it to expand in the die cavity of the molding die.
2. When thermoplastic material is used and extruded into a molding through the extruding die and the extruded molding is seized by clamping means, the nozzle must be immediately inserted into the extruded molding so that the extruded molding can be swollen with air, avoiding its two opposite side walls from adhering together. This blow molding procedure is not suitable for making a hollow product having a short pitch between its two opposite side walls.
3. If the peripheral wall thickness of the extruded molding is not uniform, the extruded molding will bias from the course, causing itself unable to fall to the accurate position for catching by clamping means. Even if the extruded molding is seized by clamping means and put in the die cavity of the molding die for molding, the ununiform wall thickness may cause the side walls of the finished product to be partially adhered together after the finished product is removed from the molding die.

SUMMARY OF THE INVENTION

The present invention has been accomplished to provide an extrusion molding process which eliminates the aforesaid drawbacks. According to the extrusion molding process of the present invention, when a molding is extruded from an extruding die, one clamping device of a molding die unit is clamped on the bottom end of the extruded molding and lowered to stretch the extruded molding downwards, then a second clamping device of the molding die unit is clamped on the upper end of the extruded molding, causing an air-tight space to be formed in the clamped molding, and then two symmetrical halves of a molding die are moved toward each other between the two clamping devices and then closed on the clamped molding, causing the molding to be compressed in the die cavity of the molding die. When the molding is compressed, its inside pressure is relatively increased, thereby causing the wall of the molding to be closely attached to the surface of the die cavity of the molding die. When the molding die is opened after molding, the clamping devices are released, and the molding die unit is lifted to its former position for a next molding cycle. According to another aspect of the present invention, the extruding die comprises a conical core, an air nozzle mounted in the conical core, a ring-shaped mold plate mounted around the conical core and defining a gap around the conical core through which gap fed material is extruded into an extruded molding, and adjustment screws controlled to adjust the size of the gap between the conical core and the ring-shaped mold plate subject to the depth of the die cavity of the molding die. According to still another aspect of the present invention, the die cavity of the molding die has a raised recess which makes a particular part of the wall of the molded product thinner, so that the thin wall portion of the molded product can be forced to break by the inside pressure of the molded product upon opening of the molding die, for permitting the gas inside of the molded product to escape.

BRIEF DESCRIPTION OF THE DRAWINGS

FIG. 16 is a plain view showing the two ends of the extruded molding clamped by the frame of the molding die unit according to the present invention;

FIG. 17 is a plain view showing the two ends of the extruded molding clamped by the frame of the molding die unit and the molding die closed on the molding; and FIG. 18 is a sectional view of a part of the molding die, showing the structure of the pin in the die cavity.

DETAILED DESCRIPTION OF THE PREFERRED EMBODIMENT

Figure 6:
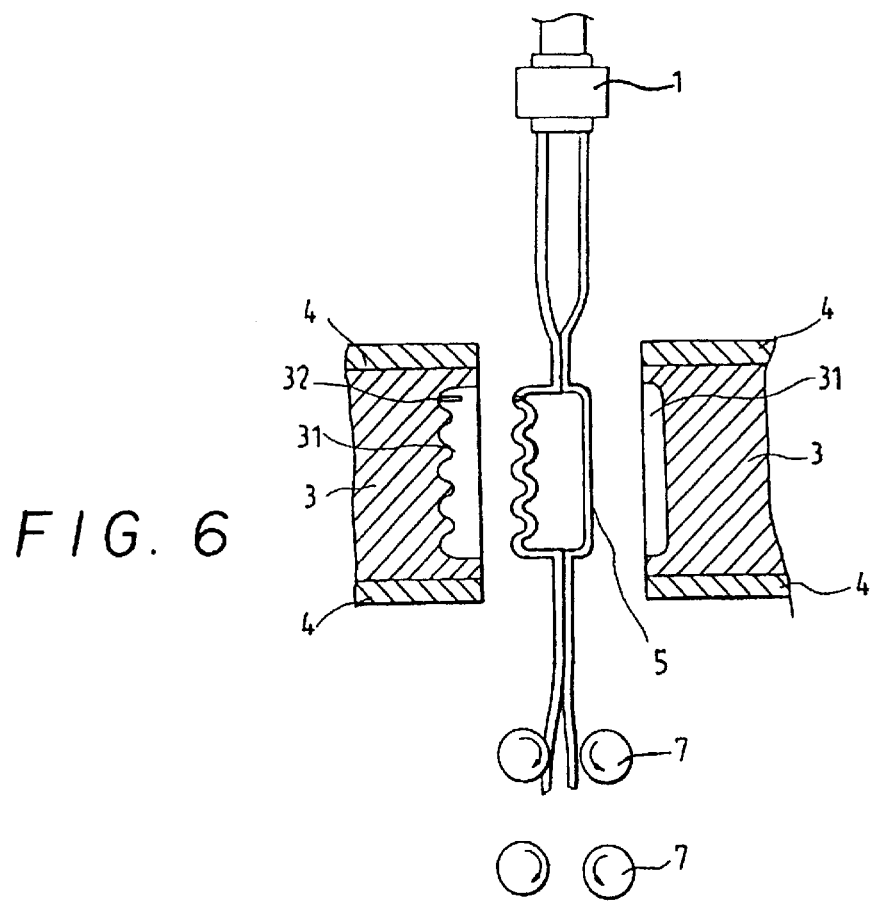
FIG. 6 is a sectional view of the extrusion molding apparatus according to the present invention, showing the molding molded into a finished product, the molding die opened, and the clamping devices released.

Referring to FIG. 6, a molding die unit 2 is set below an extruding die 1. A driving mechanism (not shown) is mounted on the molding die unit 2 for vertical or oblique lifting control. The molding die unit 2 comprises a molding die 3, and two clamping devices 4 mounted on both sides of the molding die 3. The molding die 3 is comprised of two symmetrical halves, having a cavity 31 defined between its two symmetrical halves and a pin 32 raised from its one-half within the cavity 31. Rollers 7 of a roller conveyer are disposed below the molding die unit 2.

Referring to FIG. 18, a through hole 33 is made through the pin 32 of the molding die 3 which imparts a passage between the cavity 31 and the outside of the molding die 3. A groove 34 is made on the end surface of the pin 32 and extended to the through hole 33, having at least one end passing to the periphery of the pin 32. An adjustment element 35 is mounted in the through hole 33. By adjusting the vertical position of the adjustment element 35 in the through hole 33, the wall thickness of the finished product in the through hole 33 is controlled at the range between the end surface of the pin 32 to the adjustment element 35. Therefore, when the die is opened, the inside high pressure of the finished product immediately breaks the wall part of the finished product which extends to the adjustment element 35, and escapes to the outside to let inside pressure and outside pressure be balanced.

When the aforesaid pin 32 is abutted against the pin of another cavity, high pressure from extrusion passes along the groove 34 to break the wall part of the finished product which extends to the adjustment element 35 and to escape to the outside. Alternatively, the aforesaid through hole 33 can be made at the surface of the cavity 31 at the desired location, and the aforesaid adjustment element 35 can be installed in the through hole 33 and adjusted to control the wall thickness of the finished product in the through hole 33, so that when the die is opened, the inside high pressure of the finished product immediately breaks the wall part of the finished product which extends to the adjustment element 35, and escapes to the outside to permit the inside pressure and the outside pressure to be balanced.

Figure 7:
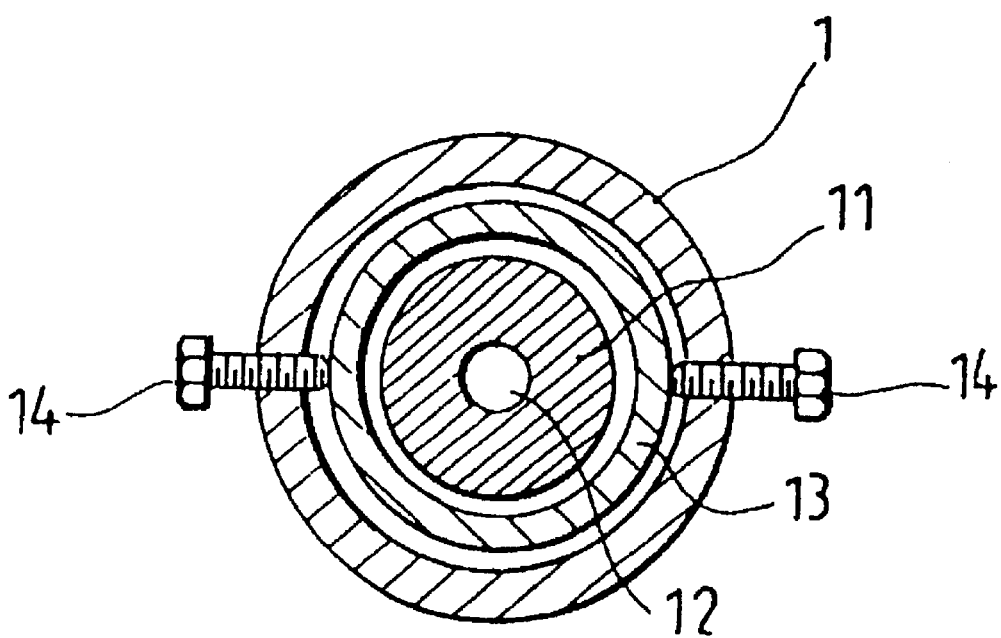
FIG. 7 is a cross sectional view of the extruding die according to the present invention.

Referring to FIG. 7, the extruding die 1 comprises a conical core 11 made subject to the design of the desired finished product, an air nozzle 12 mounted in the conical core 11, a ring-shaped mold plate 13 mounted around the conical core 11, and adjustment screws 14 controlled to adjust the configuration of the gap between the conical core 11 and the ring-shaped mold plate 13 subject to the depth of the cavity 31 of the molding die 3. Therefore, when material is delivered to the extruding die 1, it can be extruded through the gap between the conical core 11 and the ring-shaped mold plate 13 into a molding 5 of thickness subject to the depth of the cavity 31 (see also FIG. 6).

Figure 1:
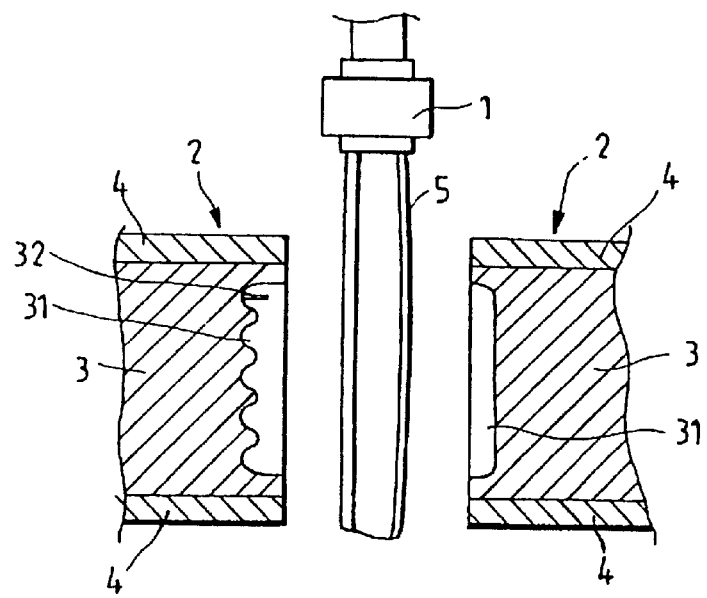
FIG. 1 is a sectional view of an extrusion molding apparatus showing a tubular molding extruded from the extruding die of the apparatus according to the present invention.
Figure 8:
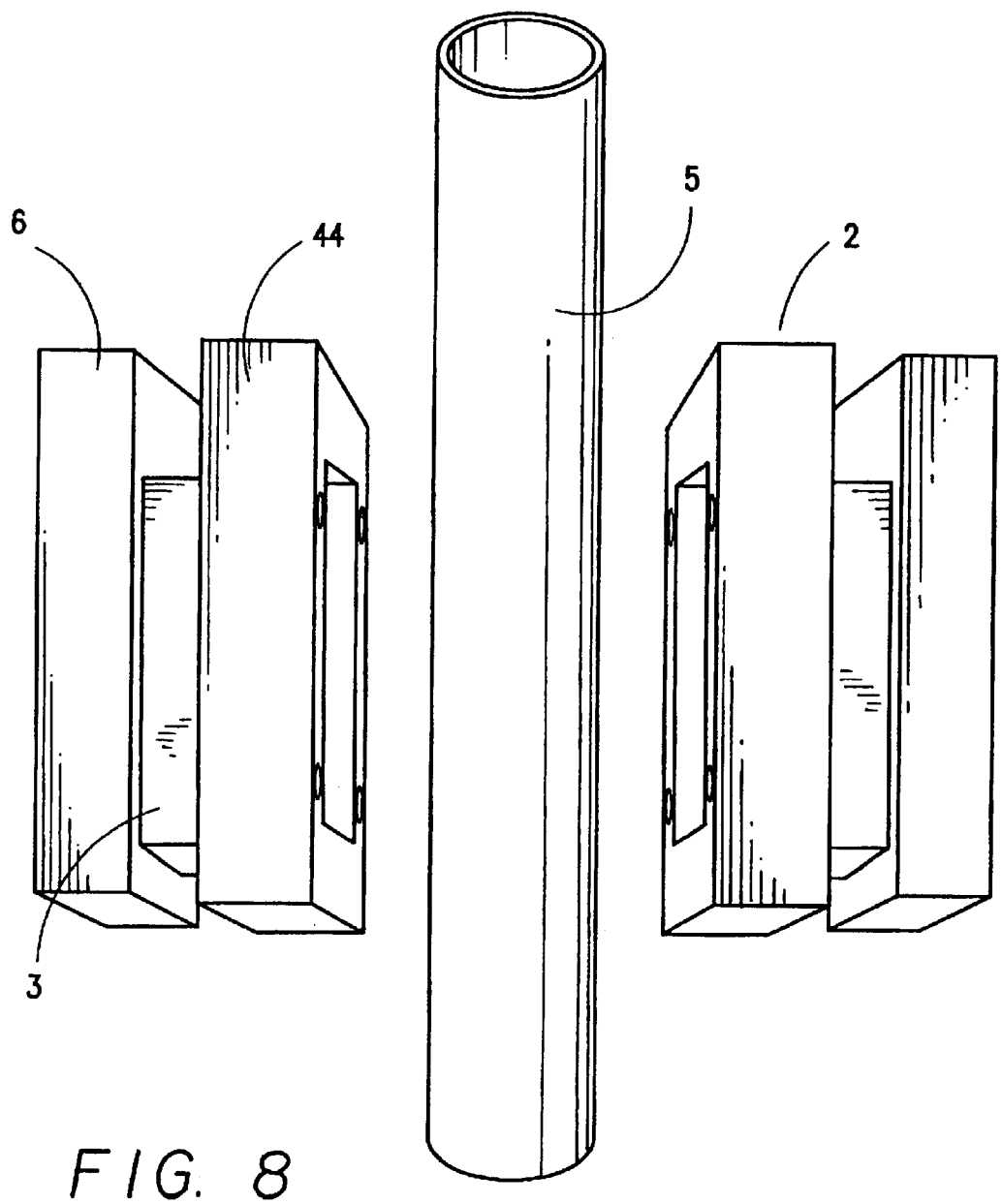
FIG. 8 shows the structure of a part of the molding die unit according to the present invention.
Figure 10:
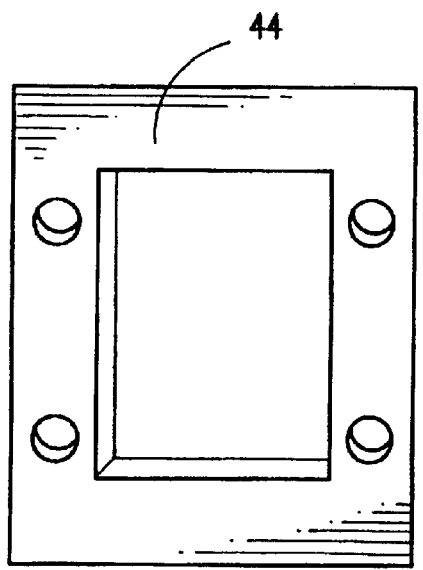
FIG. 10 is a plain view of the frame for the molding die unit according to the present invention.
Figure 9:
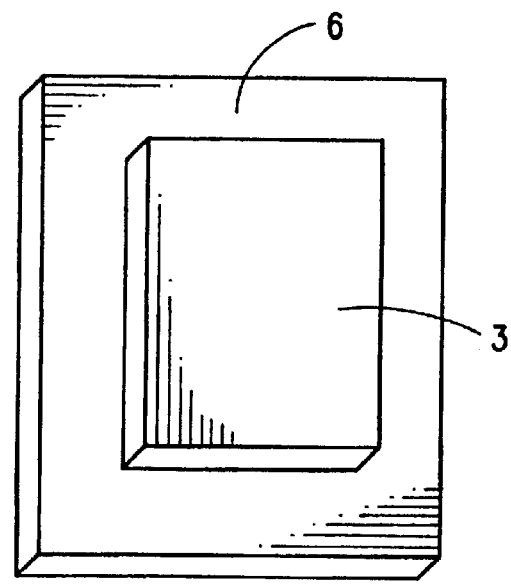
FIG. 9 shows one die half of the molding die mounted on a base plate according to the present invention.
Figure 11:
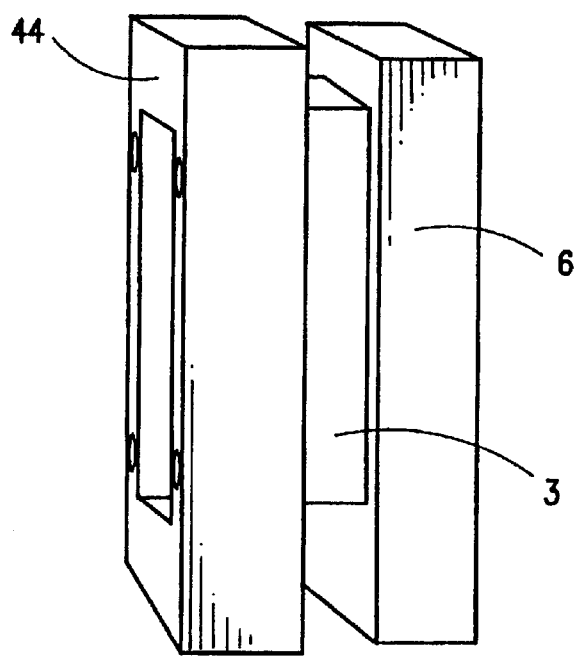
FIG. 11 shows one die half of the molding die connected between the base plate and the frame according to the present invention.
Figure 15:
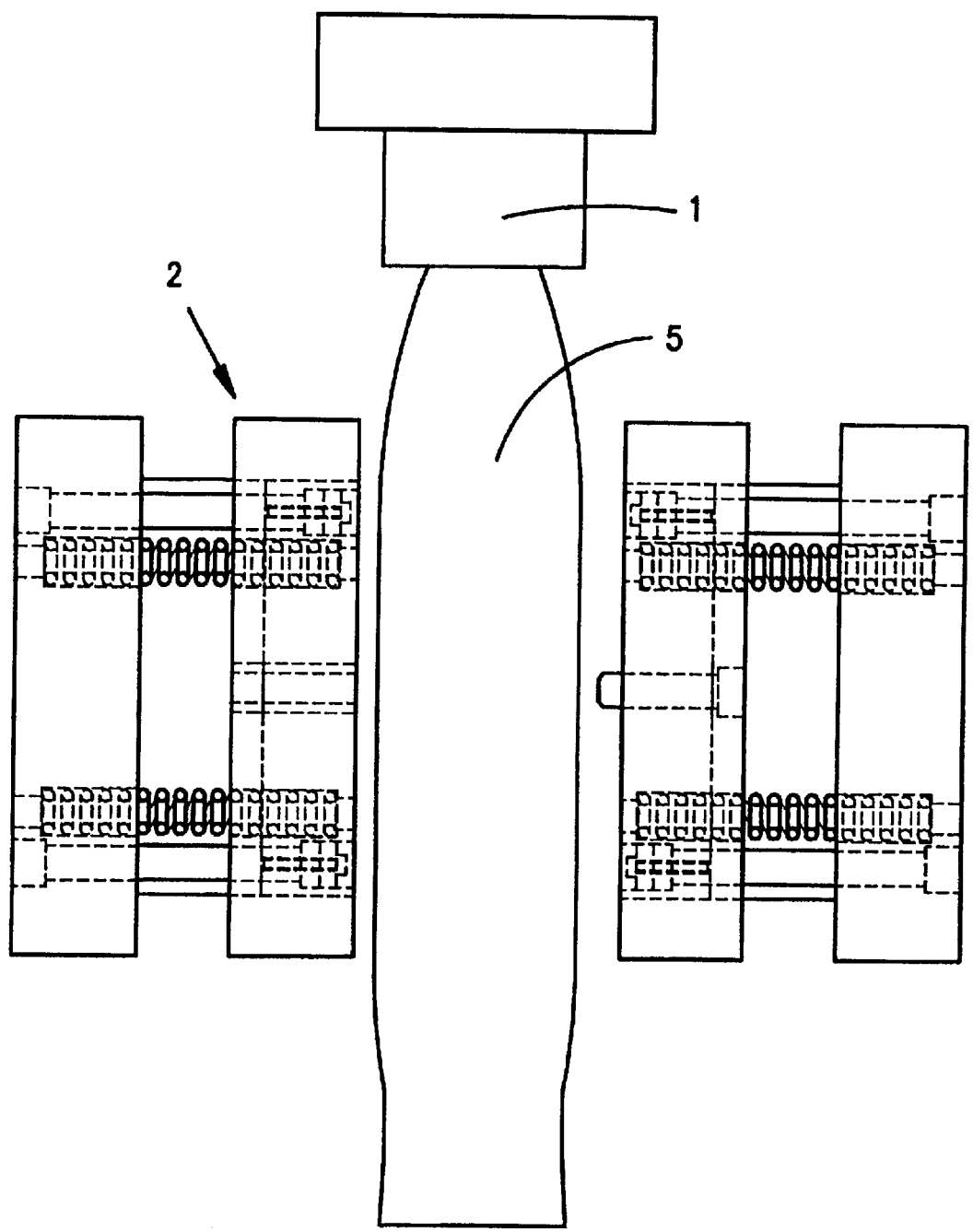
FIG. 15 is a side plain view of the present invention, showing a tubular molding extruded from the extruding die.

Referring to FIGS. 1, 8 and 15, when material is poured into the extruding machine, it is heated and extruded out of the extruding die 1 by a screw (this procedure is similar to the prior art, therefore it is neither shown by drawings nor described in detail). Before extrusion, the gap between the conical core 11 and the ring-shaped mold plate 13 is adjusted subject to the depth of the cavity 31. When extruded, the molding 5 which has a uniform wall thickness falls to the molding die 3.

Figure 2:
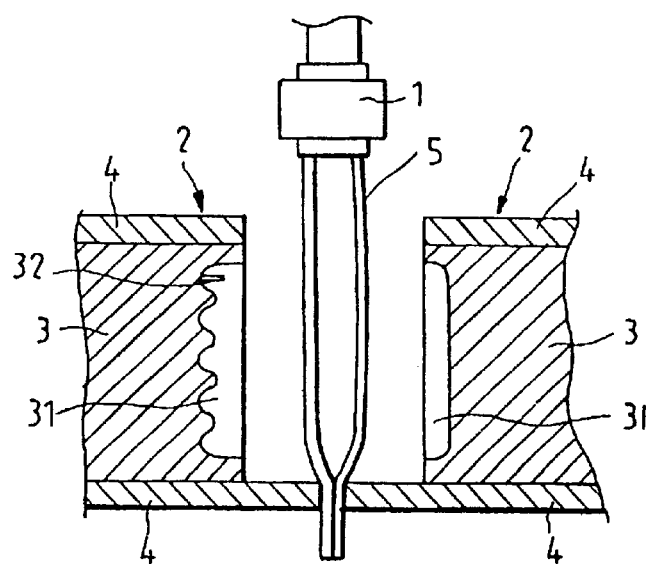
FIG. 2 is a sectional view of the extrusion molding apparatus of the present invention, showing the lower clamping device clamped on the bottom end of the tubular molding.

Referring to FIG. 2, when the molding 5 falls from extruding die 1 at a certain distance, the two symmetrical parts of the clamping device 4 which is disposed at the bottom side remote from the extruding die 1 are moved toward each other at a fixed speed to hold down the bottom end of the molding 5.

Figure 3:
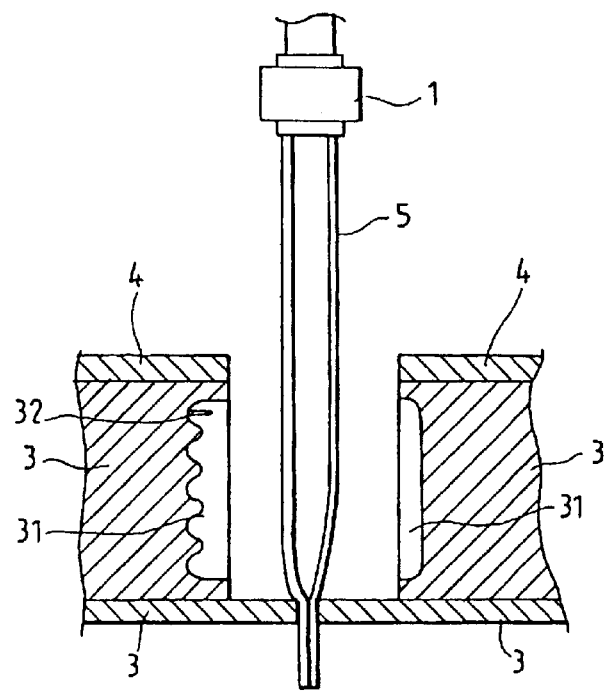
FIG. 3 is a sectional view of the extrusion molding apparatus according to the present invention, showing the molding die unit lowered, the tubular molding stretched downwards.

Referring to FIG. 3, when the bottom end of the molding 5 is seized by the clamping device 4 at the bottom side, the whole molding die unit 2 is moved downwards at a constant speed, causing the molding 5 to be simultaneously stretched downwards.

Figure 4:
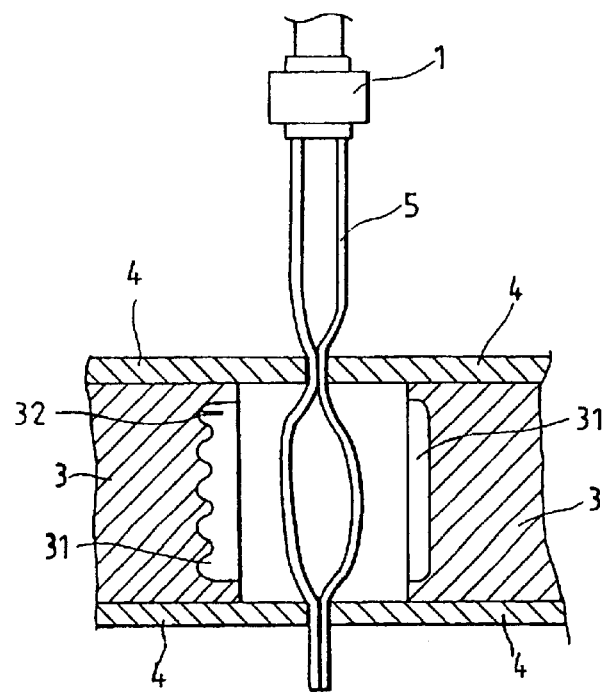
FIG. 4 is a sectional view of the extrusion molding apparatus according to the present invention, showing the upper clamping device and the lower clamping device respectively clamped on the tubular molding at different elevations.

Referring to FIG. 4, when the molding 5 is stretched downwards, the two symmetrical parts of the clamping device 4 at the top side are moved toward each other to clamp the molding 5.

Figure 5:
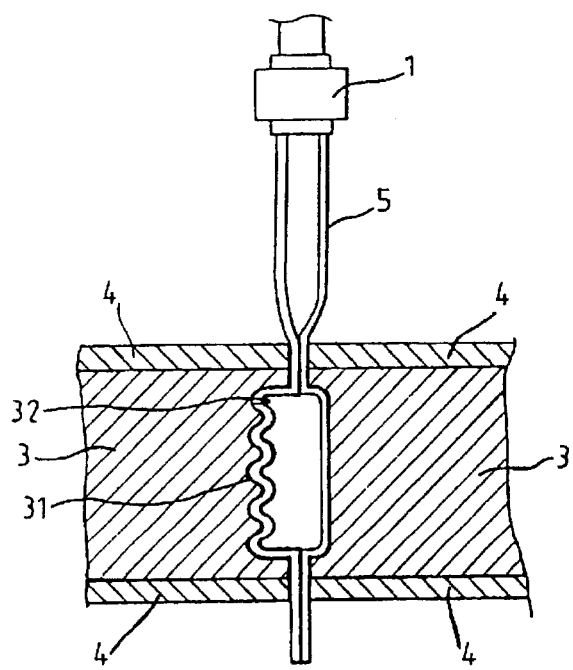
FIG. 5 is a sectional view of the extrusion molding apparatus according to the present invention, showing the upper clamping device and the lower clamping device respectively clamped on the tubular molding at different elevations, and the molding die closed on the tubular molding between the clamping devices.

Referring to FIG. 5, when the two clamping devices 4 are respectively secured to the molding 5, the molding die unit 2 is continuously moved downwards at a constant speed, and at the same time the two symmetrical halves of the molding die 3 are moved toward each other and closed on the molding 5. Because the molding 5 has a tubular configuration and both its ends are scaled by the clamping devices 4, the volume of the molding 5 between the clamping devices 4 is relatively reduced when the two symmetrical halves of the molding die 3 are moved toward each other against the molding 5. According to Boyle and Richard's jaw $P_1V_1=P_2V_2=NRT$, the inside pressure of the molding 5 between the clamping devices 4 is relatively increased when compressed by the molding die 3, therefore the wall of the molding 5 between the clamping devices 4 is forced by the increased inside pressure of the molding 5 to closely adhere to the surface of the cavity 31 of the molding die 3. Because the molding 5 is stretched downwards and its both ends are seized by the clamping devices 4 and the inside pressure of the molding 5 forces the tubular wall of the molding 5 to expand, the molding 5 expands uniformly three-dimensionally.

Referring to FIGS. 6 and 18, when the molding die unit 2 is closed on the molding 5 and lowered to the set location, the two symmetrical halves of the molding die 3 are bilaterally moved away from the molding 5, and the clamping devices 4 are simultaneously released from the molding 5. When the molding die 3 is opened from the molding 5 the wall part of the molding 5 corresponding to the pin 32 is relatively thinner and immediately broken by the inside pressure of the molding 5 upon the opening of the molding die 3, permitting the inside pressure of the molding 5 to be maintained balanced with the outside pressure. When the molding 5 is molded into the desired shape (finished product), the molding die unit 2 is released, permitting the finished product to be delivered by the rollers 7 to the collecting area, and then the molding die unit 2 is moved back to its former position for a next cycle.

Referring to FIGS. 8, 9, 10 and 11, each half of the molding die 3 is mounted on a respective base plate 6, and each part of each clamping device 4 is mounted on a frame 44 around one-half of the molding die 3.

Figure 12:
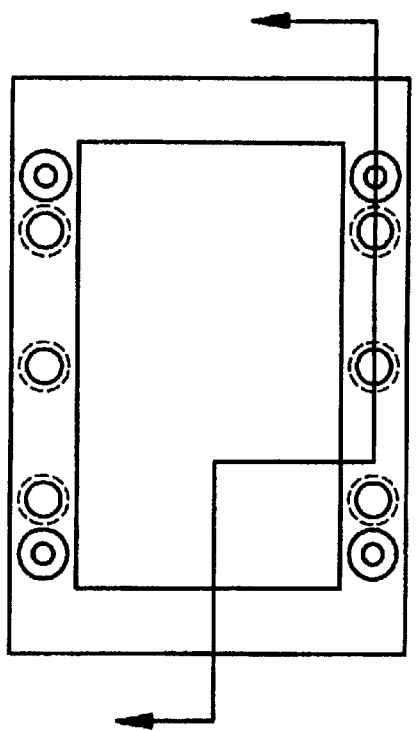
FIG. 12 is a front plain view of the molding die unit according to the present invention.
Figure 13:
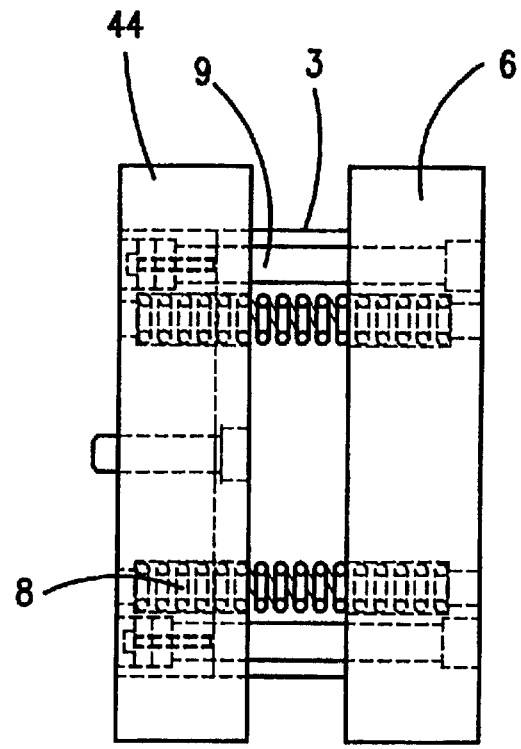
FIG. 13 is a side plain view of the molding die unit according to the present invention.
Figure 14:
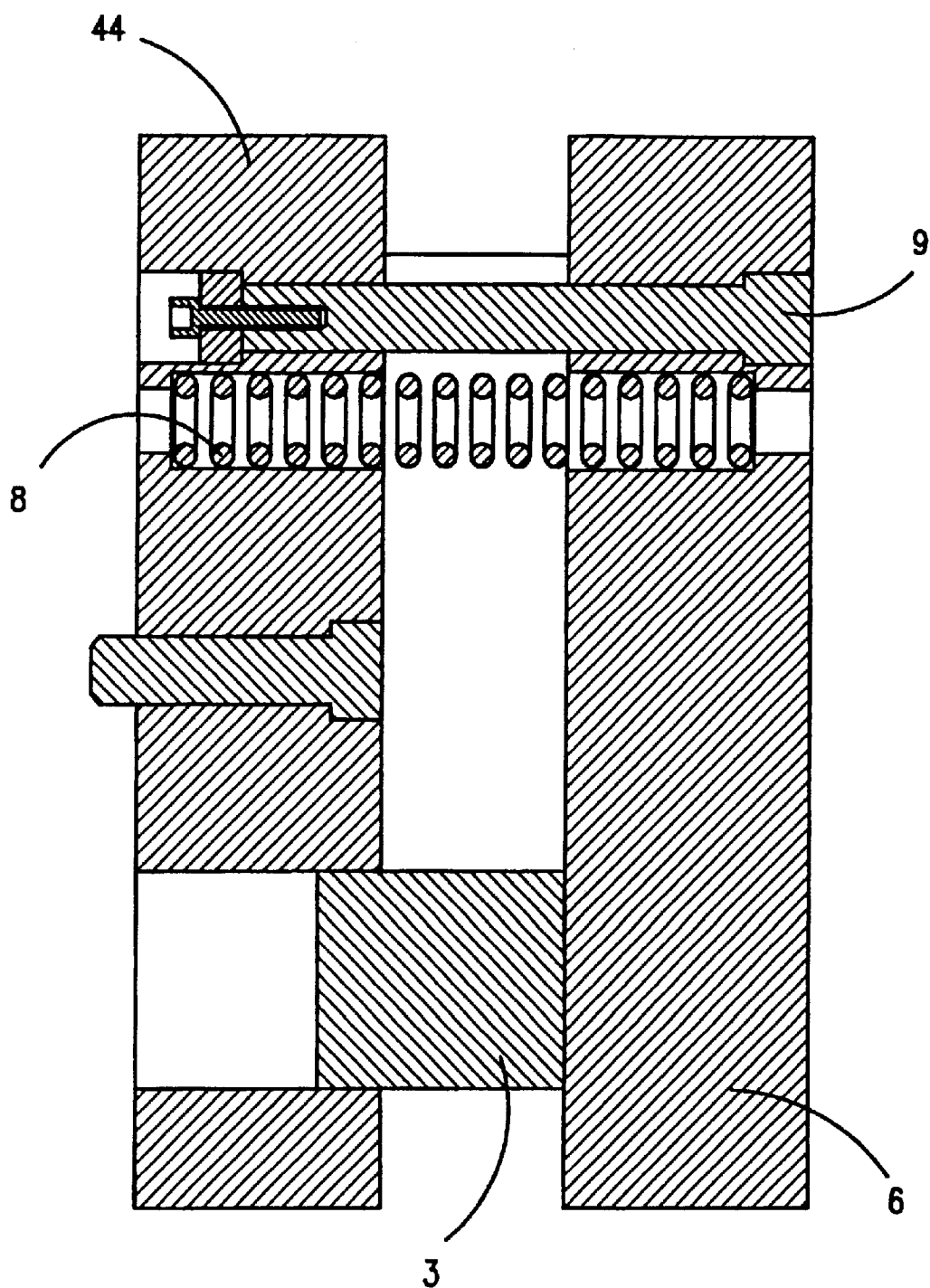
FIG. 14 is a sectional view of the molding die unit according to the present invention.

Referring to FIGS. 12, 13 and 14, guide rods 9 are fixedly mounted on the base plate 6 and inserted through holes (not shown) on the frame 44 for guiding the movement of the frame 44. A spring 8 is mounted between the base plate 6 and the frame 44 to force them apart. When the squeezing force is released, the spring 8 immediately pushes the base plate 6 and the frame 44 apart, causing them to be returned to their former positions.

Referring to FIGS. 16 and 17, the clamping and compressing procedure can be down before the molding die 3 is lowered.

It is to be understood that the drawings are designed for purposes of illustration only, and are not intended as a definition of the limits and scope of the invention disclosed.

What the invention claimed is:

1. An apparatus for extrusion molding comprising:
   a) an extruding die for extruding a material into a hollow tubular molding;
   b) a first clamping device arranged to clamp a first molding portion;
   c) a second clamping device arranged to clamp a second molding portion, said first and second clamping devices being positioned along the length of the molding in a spaced relationship and configured to clamp the molding independently of one another, wherein said first clamping device clamps said first molding portion to permit stretching thereof and said second clamping device is arranged to clamp said second molding portion after said first clamping device clamps said first molding portion to thereby form an air-tight space within the molding between the first and second clamping devices;
   d) a molding die including a pair of corresponding die cavity halves closeable around the air-tight space of the molding between the clamping devices to compress the molding and conform same to a final product configuration of the die cavity; and
   e) means for releasing compressed air from the final product configuration wherein said means releases compressed air from said final product configuration of said molding before said die cavity halves are fully separated.

2. The apparatus of claim 1 wherein the extruding die includes a conical core, an air nozzle mounted within the conical core, a ring-shaped mold plate surrounding the conical core and defining a gap there between, and a plurality of adjustment screws for adjusting the configuration of the gap.

3. The apparatus of claim 1 wherein the means for releasing compressed air includes one die cavity half of the molding die having an inwardly extending pin, a through hole formed in the pin for providing communication between the interior of the die cavity and the exterior of the molding die, a groove formed on an inner end surface of the pin, the groove extending to the through hole and having an end extending to a periphery of the pin, and an adjustment element disposed within the through hole, the adjustment element being movable within the through hole to establish the wall thickness of the finished molded product in the through hole within a range between the inner end surface of the pin and the adjustment element.

4. The apparatus of claim 1 wherein the means for releasing compressed air includes the molding die having a relief hole for exhausting pressure from the die cavity to the exterior of the molding die.

5. The apparatus of claim 1 further including a movable element mounted within the relief hole for varying the depth of the relief hole.

6. The apparatus of claim 1 further including a frame enclosing the molding die, and the first and second clamping devices installed within the frame.

7. The apparatus of claim 1 further including at least an additional element which, together with the first and second clamping devices, collectively forms a clamping structure for enclosing the molding die.

8. The apparatus of claim 1 wherein the means for releasing compressed air includes the molding die further having a hole formed therein and a movable element disposed within the hole for permitting a portion of the compressed molding to enter the hole and form a thinned walled portion in the molding to allow the escape of internal air therefrom.

9. An apparatus for extrusion molding comprising:
   a) an extruding die for extruding a material into a hollow tubular molding;
   b) a first clamping device arranged to clamp a first molding portion;
   c) a second clamping device arranged to clamp a second molding portion, said first and second clamping devices being positioned along the length of the molding in a spaced relationship and configured to clamp the molding independently of one another, wherein said first clamping device clamps said first molding portion to permit stretching thereof and said second clamping device is arranged to clamp said second molding portion after said first clamping device clamps said first molding portion to thereby form an air-tight space within the molding between the first and second clamping devices;
   d) a molding die including a pair of corresponding die cavity halves closeable around the air-tight space of the molding between the clamping devices to compress the molding and conform same to a final product configuration of the die cavity; and
   e) means for releasing compressed air from the final product configuration, said means forming a portion of one die cavity half wherein said means forms a thin walled region along a side of said final product configuration of said molding.

10. The apparatus of claim 9 wherein said one die cavity half of the molding die having an inwardly extending pin, a through hole formed in the pin for providing communication between the interior of the die cavity and the exterior of the molding die, a groove formed on an inner end surface of the pin, the groove extending to the through hole and having an end extending to a periphery of the pin, and an adjustment element disposed within the through hole, the adjustment element being movable within the through hole to establish the wall thickness of the finished molded product in the through hole within a range between the inner end surface of the pin and the adjustment element.

11. The apparatus of claim 9 wherein the means for releasing compressed air includes the molding die having a relief hole for exhausting pressure from the die cavity to the exterior of the molding die.

12. The apparatus of claim 11 further including a movable element mounted within the relief hole for varying the depth of the relief hole.

13. The apparatus of claim 9 wherein the means for releasing compressed air includes the molding die further having a hole formed therein and a movable element disposed within the hole for permitting a portion of the compressed molding to enter the hole and form the thinned wall portion in the molding to allow the escape of internal air therefrom.

* * * * *